(12) United States Patent
He et al.

(10) Patent No.: US 12,122,213 B2
(45) Date of Patent: *Oct. 22, 2024

(54) HOLISTIC THERMAL MANAGEMENT HEAT PUMP SYSTEM FOR A VEHICLE

(71) Applicant: Rivian IP Holdings, LLC, Irvine, CA (US)

(72) Inventors: Jing He, Novi, MI (US); Henry Huang, Ann Arbor, MI (US); Mayur Gaikwad, Wixom, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/892,335

(22) Filed: Aug. 22, 2022

(65) Prior Publication Data

US 2022/0396118 A1 Dec. 15, 2022

Related U.S. Application Data

(63) Continuation of application No. 17/077,405, filed on Oct. 22, 2020, now Pat. No. 11,446,979.

(51) Int. Cl.
*F25B 27/00* (2006.01)
*B60H 1/00* (2006.01)

(52) U.S. Cl.
CPC ..... *B60H 1/00278* (2013.01); *B60H 1/00899* (2013.01); *B60H 2001/00307* (2013.01); *B60H 2001/00928* (2013.01)

(58) Field of Classification Search
CPC ............ B60H 1/00278; B60H 1/00899; B60H 2001/00307; B60H 2001/00928

USPC ........................................................ 62/238.7

See application file for complete search history.

(56) References Cited

U.S. PATENT DOCUMENTS

| 10,183,549 | B2 | 1/2019 | Koberstein et al. |
| 10,393,487 | B2 | 8/2019 | Riess |
| 11,072,259 | B2 | 7/2021 | Gonze et al. |
| 11,207,939 | B2 | 12/2021 | Johnston et al. |

(Continued)

FOREIGN PATENT DOCUMENTS

| CN | 104890467 A | 9/2015 |
| CN | 111727127 A | 9/2020 |

OTHER PUBLICATIONS

Chinese Office Action from Chinese Patent Application No. 202111091169.9, dated Sep. 28, 2023, 12 pages, including English language translation.

(Continued)

*Primary Examiner* — Davis D Hwu

(74) *Attorney, Agent, or Firm* — BAKERHOSTETLER

(57) ABSTRACT

A thermal management heat pump system and method for a vehicle, including: a cabin thermal management loop including a refrigerant loop; an energy storage system thermal management loop including a coolant loop; a power electronics thermal management loop including the coolant loop; a heat exchanger selectively coupling the refrigerant loop and the coolant loop responsive to one or more of a sensed and a commanded operating state of the vehicle; and a multi-port valve assembly selectively coupling the energy storage system thermal management loop and the power electronics thermal management loop responsive to the one or more of the sensed and the commanded operating state of the vehicle.

20 Claims, 10 Drawing Sheets

(56) References Cited

U.S. PATENT DOCUMENTS

| | | | |
|---|---|---|---|
| 11,446,979 B2* | 9/2022 | He | B60H 1/00278 |
| 2018/0050605 A1* | 2/2018 | Lewis | B60L 58/25 |
| 2018/0312034 A1 | 11/2018 | Korberstein et al. | |
| 2019/0118610 A1 | 4/2019 | Johnston et al. | |
| 2019/0299791 A1 | 10/2019 | Gonze et al. | |
| 2021/0370748 A1 | 12/2021 | Groen et al. | |

OTHER PUBLICATIONS

Chinese Search Report from Chinese Patent Application No. 202111091169.9, dated Sep. 25, 2023, 6 pages, including English language translation.

* cited by examiner

HOLISTIC THERMAL MANAGEMENT HEAT PUMP SYSTEM FOR A VEHICLE

CROSS-REFERENCE TO RELATED APPLICATION

The present disclosure is a continuation (CON) of U.S. patent application Ser. No. 17/077,405, filed on Oct. 22, 2020, and entitled "HOLISTIC THERMAL MANAGEMENT HEAT PUMP SYSTEM FOR A VEHICLE," the contents of which are incorporated in full by reference herein.

INTRODUCTION

The present disclosure relates generally to the automotive field. More particularly, the present disclosure relates to a holistic thermal management heat pump system for a vehicle, such as an electric vehicle (EV).

Driven by direct and indirect legislation, electrification will be required for compliance in the future automotive world. With rapid adoption in the EV market, the continuous improvement of heat pump technology towards higher efficiency, improved capability, and lower cost is always sought to meet the increasing demand for electrification.

The present background is provided as illustrative environmental context only and should not be construed as being limiting in any manner. The principles of the present disclosure may be applied in other environmental contexts equally.

SUMMARY

The present disclosure relates to a heat pump system that provides holistic thermal management in EVs, with a simplified architecture that integrates refrigerant and coolant circuits and enables efficient, comprehensive modes that can handle various operating conditions. The thermal management heat pump system of the present disclosure selectively integrates the cabin thermal management loop, the energy storage system (ESS) (i.e., battery) thermal management loop, and the power electronics thermal management loop of an EV, is cost efficient through potential elimination of a high-voltage heater, and is energy efficient across a broad range of ambient conditions through robust, comprehensive operating modes. The thermal management heat pump system utilizes an advantageous configuration of one or more expansion valves (EXVs), one or more shut-off valves (SOVs), and one or more one-way check valves (CVs) on the refrigerant side, a multi-port valve assembly to integrate the ESS and power electronics thermal management loops on the coolant side, and thermal communication between the refrigerant and coolant circuits via a refrigerant-to-coolant heat exchanger (e.g., a chiller).

In one illustrative embodiment, the thermal management heat pump system includes: a cabin thermal management loop including a refrigerant loop; an energy storage system thermal management loop including a coolant loop; a power electronics thermal management loop including the coolant loop; and a first heat exchanger selectively coupling the refrigerant loop and the coolant loop responsive to one or more of a sensed and a commanded operating state of the vehicle.

In another illustrative embodiment, the thermal management heat pump system further includes a multi-port valve assembly selectively coupling the energy storage system thermal management loop and the power electronics thermal management loop responsive to the one or more of the sensed and the commanded operating state of the vehicle.

In still another illustrative embodiment of the thermal management heat pump system, the cabin thermal management loop includes a compressor for compressing a refrigerant, a second heat exchanger receiving the refrigerant discharged from the outlet port of the compressor, a first expansion valve receiving a first portion of the refrigerant out of the second heat exchanger dependent upon a mode of operation, a first shut-off valve receiving a second portion of the refrigerant out of the second heat exchanger dependent upon a mode of operation, and a third heat exchanger receiving the refrigerant out of the first expansion valve dependent upon a mode of operation.

In still another illustrative embodiment of the thermal management heat pump system, the cabin thermal management loop further includes an accumulator receiving at least one of the refrigerant out of the first heat exchanger and the refrigerant out of the third heat exchanger via a second shut-off valve, dependent upon a mode of operation.

In still another illustrative embodiment of the thermal management heat pump system, the first heat exchanger receives at least one of a first portion of the refrigerant out of the third heat exchanger via a first check valve and a second expansion valve and a first portion of the refrigerant out of the first shut-off valve via the second expansion valve, dependent upon a mode of operation.

In still another illustrative embodiment of the thermal management heat pump system, the cabin thermal management loop further includes a fourth heat exchanger receiving at least one of a second portion of the refrigerant out of the third heat exchanger via the first check valve and a third expansion valve and a second portion of the refrigerant out of the first shut-off valve via the third expansion valve, and directing the outlet refrigerant to the accumulator, dependent upon a mode of operation.

In still another illustrative embodiment of the thermal management heat pump system, the cabin thermal management loop further includes a second check preventing refrigerant flow back to the fourth heat exchanger.

In still illustrative embodiment of the thermal management heat pump system, the energy storage system thermal management loop includes at least an energy storage system and the first heat exchanger.

In still another illustrative embodiment of the thermal management heat pump system, the power electronics thermal management loop includes at least power electronics and a fifth heat exchanger adapted to affect a temperature of the power electronics of the vehicle.

In still another illustrative embodiment of the thermal management heat pump system, the third heat exchanger receives high-temperature refrigerant from the compressor and functions as condenser to reject heat to the external fluid in a cooling mode of operation.

In still another illustrative embodiment of the thermal management heat pump system, the second heat exchanger receives high-temperature refrigerant from the compressor and rejects heat to the external fluid, and the third heat exchanger receives low-temperature refrigerant from the first expansion valve and functions as evaporator to absorb heat from the external fluid in a first heating mode of operation.

In still another illustrative embodiment of the thermal management heat pump system, the second heat exchanger receives high-temperature refrigerant from the compressor and rejects heat to the external fluid, and the first heat exchanger receives low-temperature refrigerant from the second expansion valve and functions as evaporator to absorb heat from the external fluid in a second heating mode of operation.

In still yet another illustrative embodiment of the thermal management heat pump system, the second heat exchanger receives high-temperature refrigerant from the compressor and rejects heat to the external fluid, the first heat exchanger receives low-temperature refrigerant from the second expansion valve and functions as evaporator to absorb heat from the external fluid, and the third heat exchanger receives low-temperature refrigerant from the first expansion valve and functions as evaporator to absorb heat from the external fluid in a third heating mode of operation.

In still another illustrative embodiment of the thermal management heat pump system, the second heat exchanger receives high-temperature refrigerant from the compressor and rejects heat to the external fluid, the fourth heat exchanger receives low-temperature refrigerant from the third expansion valve and functions as evaporator to absorb heat from the external fluid, and the third heat exchanger receives high-temperature refrigerant from the first expansion valve and functions as condenser to reject heat to the external fluid in a first dehumidification mode of operation.

In still another illustrative embodiment of the thermal management heat pump system, the second heat exchanger receives high-temperature refrigerant from the compressor and rejects heat to the external fluid, the fourth heat exchanger receives low-temperature refrigerant from the third expansion valve and functions as evaporator to absorb heat from the external fluid, and the third heat exchanger receives low-temperature refrigerant from the first expansion valve and functions as evaporator to absorb heat from the external fluid in a second dehumidification mode of operation.

In still yet another illustrative embodiment of the thermal management heat pump system, the second heat exchanger receives high-temperature refrigerant from the compressor and rejects heat to the external fluid, the fourth heat exchanger receives low-temperature refrigerant from the third expansion valve and functions as evaporator to absorb heat from the external fluid, the first heat exchanger receives low-temperature refrigerant from the second expansion valve and functions as evaporator to absorb heat from the external fluid, and the third heat exchanger is bypassed in a third dehumidification mode of operation.

In still another illustrative embodiment of the thermal management heat pump system, the multi-port valve assembly is operable for selectively operating the thermal management heat pump system in one of an isolation mode in which the energy storage system thermal management loop is isolated from the power electronics thermal management loop and an interconnection mode in which the energy storage system thermal management loop is interconnected with the power electronics thermal management loop.

In still another illustrative embodiment of the thermal management heat pump system, the multi-port valve assembly is a four-port valve.

In another illustrative embodiment, the thermal management heat pump method includes: given a cabin thermal management loop including a refrigerant loop, an energy storage system thermal management loop including a coolant loop, and a power electronics thermal management loop including the coolant loop, selectively coupling the refrigerant loop and the coolant loop responsive to one or more of a sensed and a commanded operating state of the vehicle using a first heat exchanger, and selectively coupling the energy storage system thermal management loop and the power electronics thermal management loop responsive to the one or more of the sensed and the commanded operating state of the vehicle using a multi-port valve assembly.

In still another illustrative embodiment the non-transitory computer readable medium stored in a memory and executed by a processor to carry out the thermal management heat pump method steps includes: given a cabin thermal management loop including a refrigerant loop, an energy storage system thermal management loop including a coolant loop, and a power electronics thermal management loop including the coolant loop, selectively coupling the refrigerant loop and the coolant loop responsive to one or more of a sensed and a commanded operating state of a vehicle using a first heat exchanger, and coupling the energy storage system thermal management loop and the power electronics thermal management loop responsive to the one or more of the sensed and the commanded operating state of the vehicle using a multi-port valve assembly.

In the following description, there are shown and described embodiments of a thermal management heat pump system and related methods. As it should be realized, the system and methods are capable of other, different embodiments and their several details are capable of modification in various, obvious aspects all without departing from the thermal management heat pump system and methods as set forth and described in the following claims. Accordingly, the drawings and descriptions should be regarded as illustrative in nature and not restrictive.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF ILLUSTRATIVE EMBODIMENTS

A heat pump is provided as a thermal management system used to improve the real world driving range of EVs due to its high efficiency and holistic energy source management capabilities, therefore holding significant potential in meeting the increasing demand for electrification. With rapid adoption in the market, the continuous improvement of this technology towards higher efficiency, improved capability, and lower cost is always sought.

The present disclosure provides such a heat pump system that provides holistic thermal management in EVs, with a simplified architecture that integrates refrigerant and coolant circuits and enables efficient, comprehensive modes that can handle various operating conditions. The thermal management heat pump system of the present disclosure selectively integrates the cabin thermal management loop, the ESS thermal management loop, and the power electronics thermal management loop of the EV, is cost efficient through the potential elimination of a high-voltage heater, and is energy efficient across a broad range of ambient conditions through robust, comprehensive operating modes. The thermal management heat pump system utilizes an advantageous configuration of one or more expansion valves (EXVs), one or more shut-off valves (SOVs), and one or more one-way check valves (CVs) on the refrigerant side, a multi-port valve assembly to integrate the ESS and power electronics thermal management loops on the coolant side, and thermal communication between the refrigerant and coolant circuits via a refrigerant-to-coolant heat exchanger (e.g., a chiller).

Figure 1:
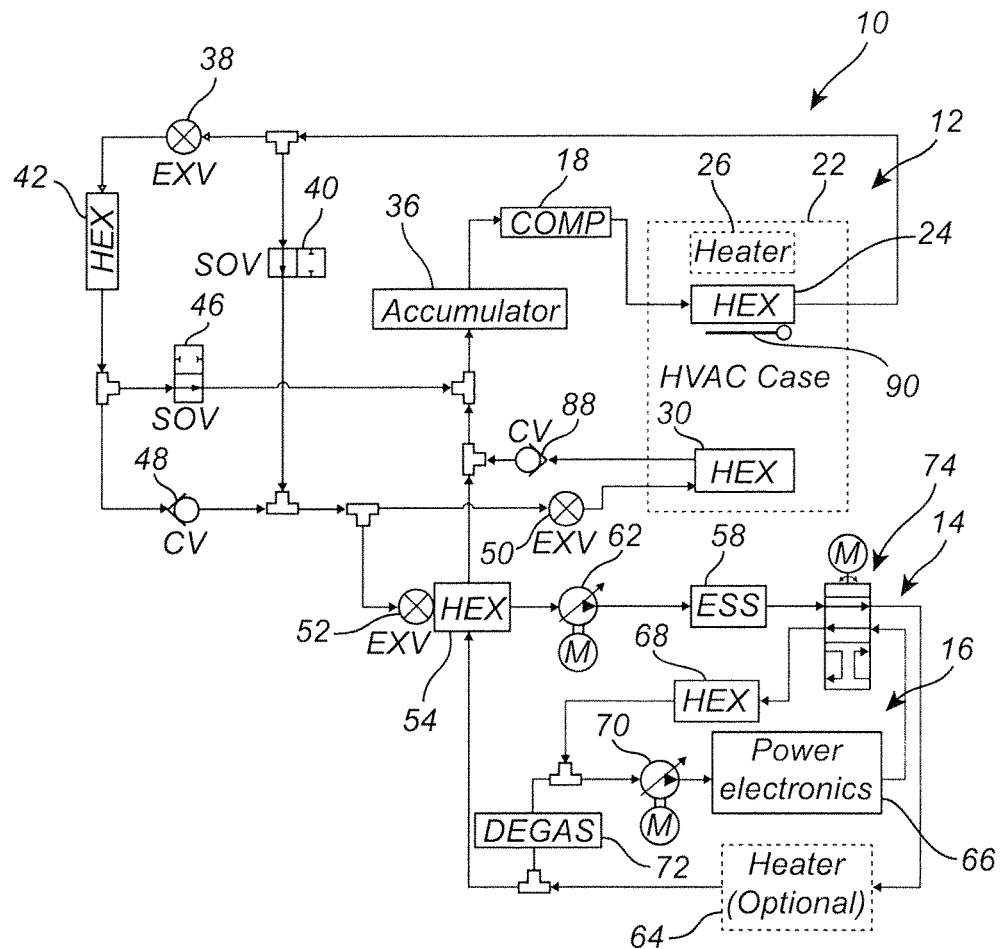
FIG. 1 is a schematic diagram of one illustrative embodiment of the thermal management heat pump system of the present disclosure.

Referring now specifically to FIG. 1, in one illustrative embodiment, the thermal management heat pump system 10 of the present disclosure includes a cabin thermal management loop 12 on the refrigerant side and an ESS thermal management loop 14 and power electronics thermal management loop 16 on the coolant side.

The cabin thermal management loop 12 includes a compressor 18, which can be electric compressor for hybrid electric or pure electric vehicles (EVs), or a belt-driven compressor for internal combustion engine (ICE) vehicles. The compressor 18 is coupled to a second heat exchanger 24. In FIG. 1, the second heat exchanger 24 is a refrigerant-to-air condenser located within the heating, ventilation, and air conditioning (HVAC) case 22 to directly exchange heat with the cabin airflow. An alternate embodiment uses a refrigerant-to-coolant heat exchanger in conjunction with a coolant loop involving a heater core to indirectly exchange heat with the cabin airflow, as is understood by those of ordinary skill in the art. A temperature blend door 90 is located adjacent to the cabin condenser that allows full, partial, or no airflow by moving the door position accordingly. The HVAC case 22 may further include an optional heater 26, e.g., a positive temperature coefficient (PTC) electrical heater, to provide supplemental heat when needed. Other components in a typical HVAC case, such as a blower, recirculation door, and mode selection door, are not depicted here and are known to those of ordinary skill in the art.

The second heat exchanger 24 is coupled to a first expansion valve (EXV) 38, which operates in one of the three modes, an expansion mode to throttle high pressure refrigerant to low pressure refrigerant, an opening mode to allow free flow, and a closing mode to prevent any flow. The second heat exchanger 24 is also coupled to a first shut-off valve (SOV) 40 in parallel, which is operable for allowing or preventing refrigerant flow. The first expansion valve 38 is coupled to a third heat exchanger 42, which can be disposed at the front end of a vehicle and operable as a condenser to reject heat to the external fluid (e.g., air) or as an evaporator to absorb heat from the external fluid (e.g., air) depending upon the mode of operation.

The third heat exchanger 42 is coupled to a second shut-off valve 46, which is operable for allowing or preventing refrigerant flow and coupled to an accumulator 36, as well as a first check valve (CV) 48 in parallel. The accumulator 36 is a vessel which stores refrigerant and oil, ensures sufficient oil return, and allows essentially vapor refrigerant to return to the compressor 18. The first check valve 48 is coupled to the first heat exchanger 54 via a second expansion valve 52, and to a fourth heat exchanger 30 via a third expansion valve 50. In FIG. 1, the fourth heat exchanger 30 is a refrigerant-to-air evaporator located within the HVAC case 22 for cooling the cabin airflow. An alternate embodiment using a refrigerant-to-coolant heat exchanger in conjunction with a coolant loop involving a cooler core to indirectly exchange heat with the cabin airflow can be understood by those with ordinary skill in the art. A second check valve 88 is placed downstream of the fourth heat exchanger 30 to prevent any backflow. The second expansion valve 52 operates in at least an expansion mode to throttle high pressure refrigerant to low pressure refrigerant and a closing mode to prevent any flow, while the third expansion valve 50 operates in one of the three modes, an expansion mode to throttle high pressure refrigerant to low pressure refrigerant, an opening mode to allow free flow, and a closing mode to prevent any flow, similar to the first expansion valve 38. The first heat exchanger is directly coupled to the accumulator, and the fourth heat exchanger is indirectly coupled to the accumulator, via the second check valve, to allow refrigerant flow into the accumulator and ultimately return to the compressor 18.

The cabin thermal management loop 12 is coupled with the ESS thermal management loop 14 via the first heat exchanger 54. The ESS thermal management loop 14 generally includes the ESS 58, such as a battery or battery pack, and a coolant pump assembly 62. An optional coolant heater 64 may be included to assist heating. Collectively, the ESS 58, the first heat exchanger 54, the coolant pump assembly 62, and the optional heater 64 are operable for controlling the environment associated with the ESS 58.

The power electronics thermal management loop 16 generally includes the power electronics 66, such as motors, inverters/converters, sensors, control systems, other interface electronics, a fifth heat exchanger 68, and a pump assembly 70. Collectively, the power electronics 66, the fifth heat exchanger 68, and the pump assembly 70 are operable for controlling the environment associated with the power electronics 66. A degas assembly 72, including a degas bottle and associated hoses and tee junctions that provide a coolant storage and deaeration function, is typically coupled between the ESS thermal management loop 14 and the power electronics thermal management loop 16.

The ESS thermal management loop 14 and the power electronics thermal management loop 16 are selectively coupled via a multi-port valve assembly 74 that allows the ESS thermal management loop 14 and the power electronics thermal management loop 16 to be interconnected or isolated. In FIG. 1, the multi-port valve assembly 74 is a four-port valve. An alternate embodiment using another type of valve, e.g., a five-port valve, or valve combinations, can be understood by those of ordinary skill in the art. The refrigerant and coolant sides hence can be holistically managed through the multi-port valve assembly 74 and the first heat exchanger 54.

Figure 2:
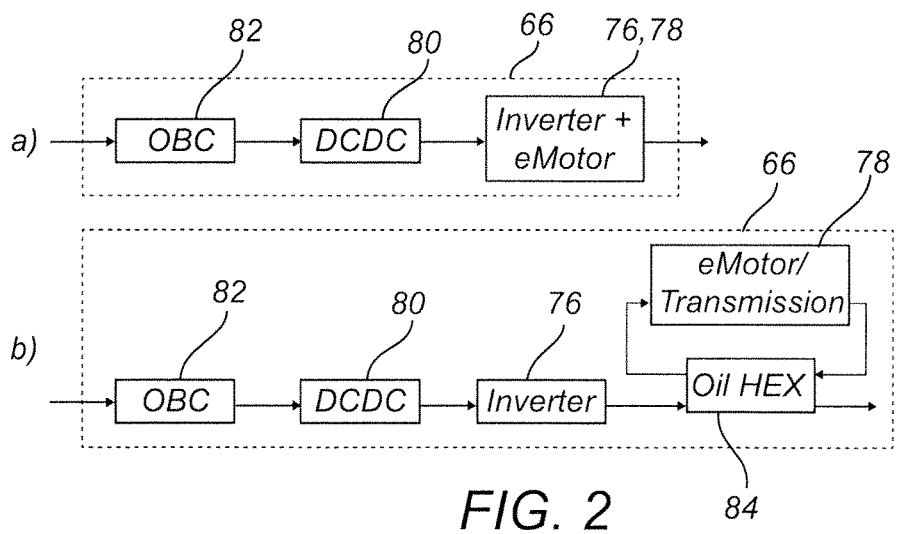
FIG. 2 is schematic diagrams of two illustrative embodiments of the power electronics circuit of the present disclosure.

FIG. 2 is schematic diagrams of two illustrative embodiments of the power electronics circuit 66 of the present disclosure. In one illustrative embodiment, the power electronics circuit 66 includes an integrated inverter 76 and traction motor 78 coupled to a direct current/direct current (DC/DC) converter 80 coupled to an onboard charger (OBC) 82. In another illustrative embodiment, the power electronics circuit 66 includes a separate inverter 78 and traction motor/transmission 78 coupled to the DC/DC converter 80 coupled to the OBC 82. The inverter 76 and motor/transmission 78 are each coupled to an oil heat exchanger 84.

Figure 3:
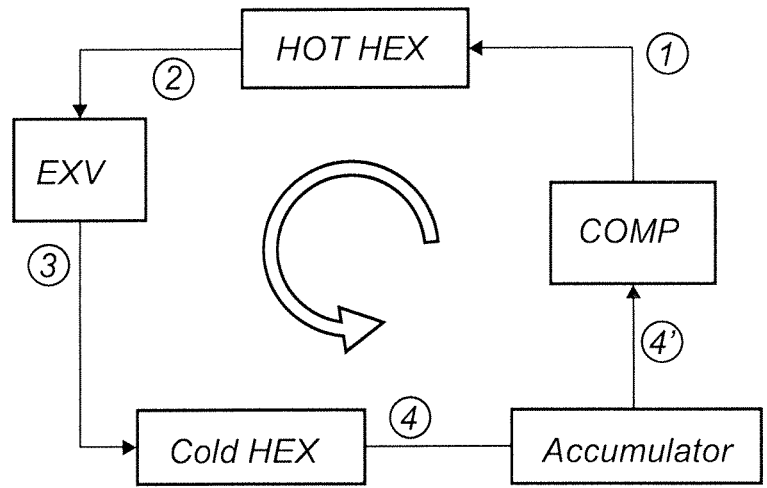
FIG. 3 is a schematic and associated pressure-enthalpy diagram illustrating the fundamentals of the refrigerant (i.e., vapor compression) cycle utilized by the thermal management heat pump system of the present disclosure.
Figure 3:
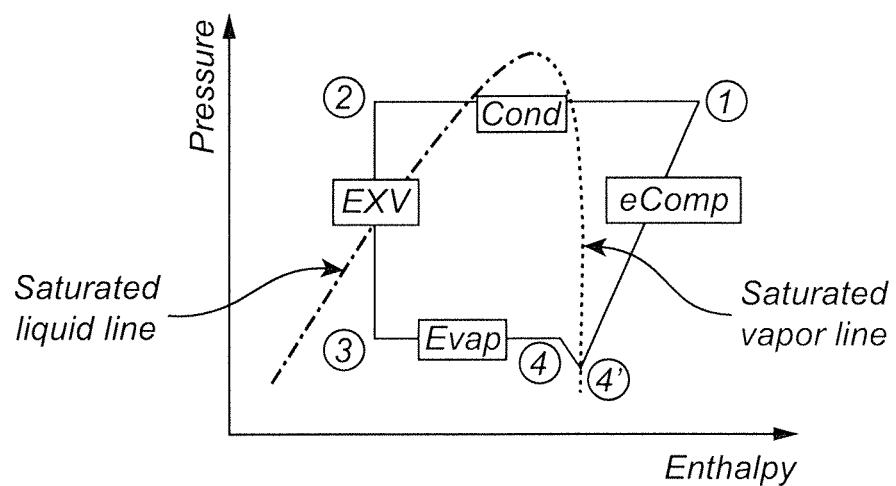

FIG. 3 is a schematic and associated pressure-enthalpy diagram (for subcritical refrigerant like R134a or R1234yf) illustrating fundamentals of the refrigerant vapor compression cycle utilized by the thermal management heat pump system 10 (FIG. 1) of the present disclosure. A refrigerant is compressed into high-pressure, high-temperature vapor and discharged out of the compressor (point 1). The high-pressure, high-temperature vapor rejects heat via a hot heat exchanger (e.g., the cabin condenser or outside heat exchanger) to the external fluid (e.g., air) and condenses to high-pressure, intermediate-temperature liquid at the outlet of the hot heat exchanger (point 2). An expansion valve throttles the high-pressure, intermediate-temperature liquid into a low-pressure, low-temperature liquid-vapor mixture (point 3), which enters a cold heat exchanger (e.g., the evaporator or chiller) to absorb heat from the external fluid (e.g., air or coolant) and boils into low-pressure, low-temperature, essentially vapor (i.e., pure vapor or predominately vapor with a small portion of liquid) at the outlet of the cold heat exchanger (point 4). The low-pressure, low-temperature, essentially vapor refrigerant enters an accumulator, experiences pressure loss to point 4', and flows back to the compressor also in a low-pressure, low-temperature, essentially vapor status to complete the cycle. Dependent upon the mode of operation, different part(s) in the thermal management heat pump system 10 may serve the function of a hot heat exchanger, an expansion valve, and a cold heat exchanger, as will be described in detail later.

There are generally three types of expansion valves: i) capillary tube (fixed orifice size; most simple), ii) thermal expansion valve (mechanical device to adjust the orifice size so that the outlet flow satisfies a preset status), and iii) electronic expansion valve (electronic device to adjust the orifice size so that the outlet flow satisfies a desired status; most advanced). The first, second, and third expansion valves in FIG. 1 are preferably electronic expansion valves, although other valve assemblies are possible to achieve similar functions. Again, the first and third expansion valves can achieve one the three modes, expansion, opening, and closing, while the second expansion valve can achieve at least the expansion and closing modes.

Figure 4:
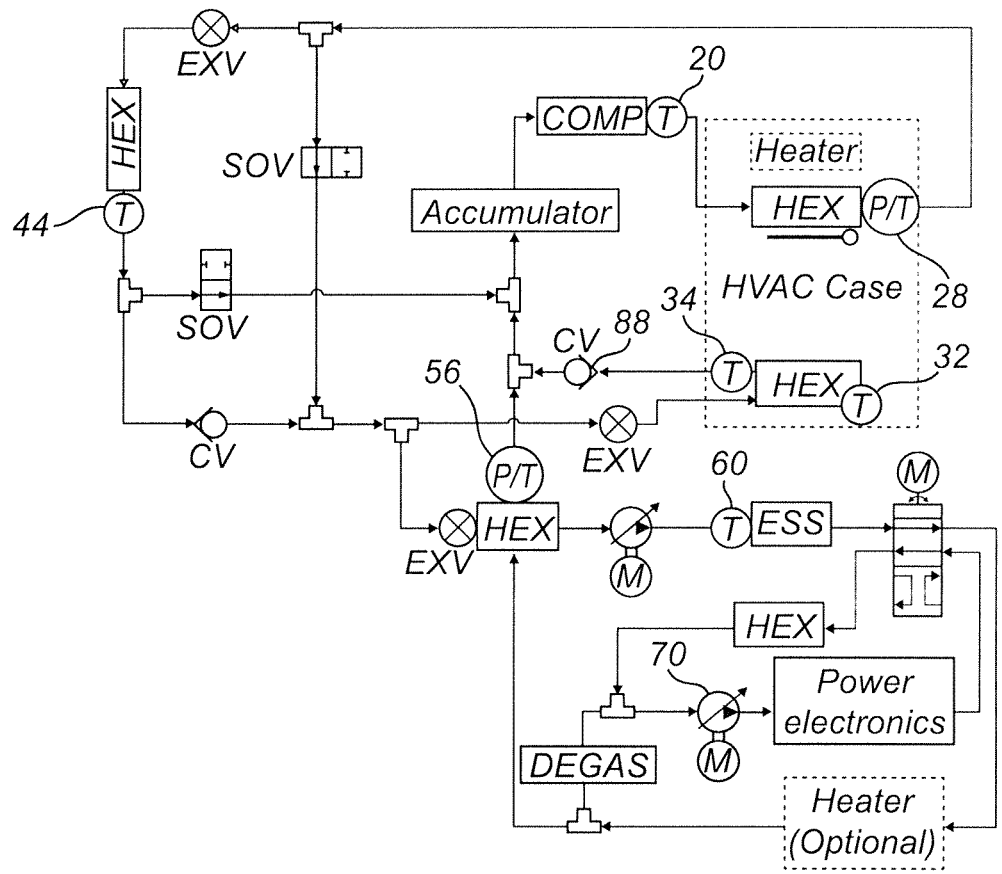
FIG. 4 is a schematic diagram of one illustrative embodiment of the sensor system utilized by the thermal management heat pump system of the present disclosure.

FIG. 4 shows one illustrative embodiment of the sensor system for controlling the thermal management heat pump system 10. For the cabin thermal management loop 12, a first temperature sensor 20 is placed at the outlet of the compressor to measure the discharge refrigerant temperature; an integrated pressure/temperature sensor 28 is placed at the outlet of the second heat exchanger, here a cabin condenser, to measure the refrigerant pressure and temperature; a second temperature sensor 44 is placed at the outlet of the third heat exchanger to measure refrigerant temperature; a third temperature sensor 32 and a fourth temperature sensor 34 are placed inside the fin passage and at the outlet of the fourth heat exchanger, respectively; and a second integrated pressure/temperature sensor 56 is placed at the outlet of the first heat exchanger. A coolant temperature sensor 60 is placed before ESS to monitor coolant temperature in the ESS thermal management loop 14. Other sensors with relatively minor impact on the controls of the thermal management heat pump system, such as those within the ESS and power electronics, are not depicted here. It will be readily apparent to those of ordinary skill of the art that other sensor configurations may be used equivalently.

Figure 5:
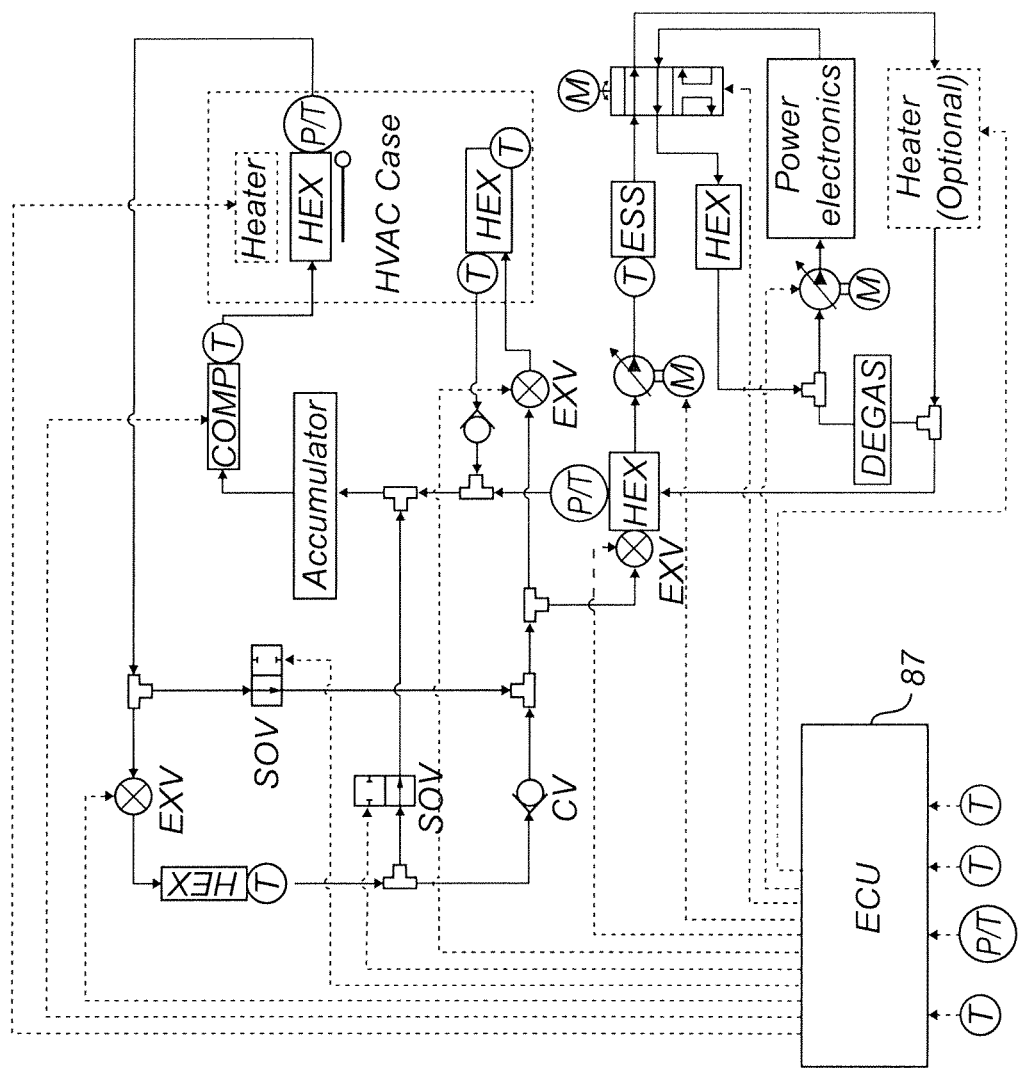
FIG. 5 is a schematic diagram of one illustrative embodiment of the electronic control unit (ECU) utilized by the thermal management heat pump system of the present disclosure.

Referring now specifically to FIG. 5, in one illustrative embodiment, an ECU 87 reads signals from the sensors shown in FIG. 4 and adjusts each controllable part to a desired status accordingly. For example, the compressor is controlled to a certain speed, the EXVs are controlled to a certain degree of opening, the SOVs are controlled to open or close, the pumps are controlled to a certain speed, the four-way valve is controlled to a certain configuration, and the heaters are controlled to a certain power.

Figure 6:
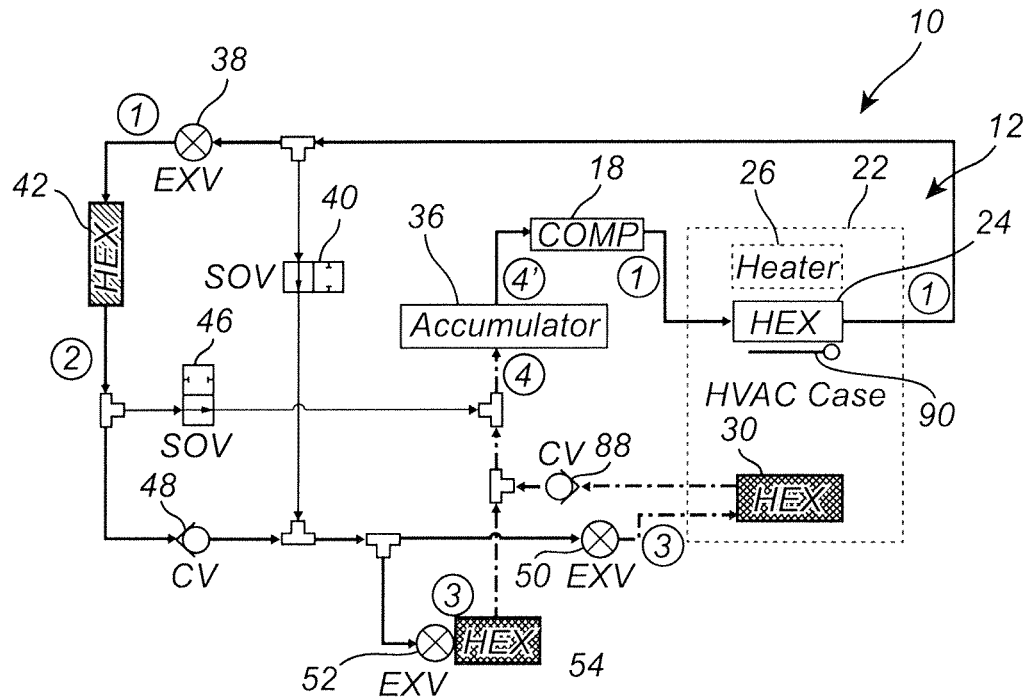
FIG. 6 is a schematic diagram of one illustrative embodiment of a cooling mode utilized by the thermal management heat pump system of the present disclosure.

FIG. 6 is a schematic diagram of one illustrative embodiment of a cooling mode utilized by the thermal management heat pump system 10 of the present disclosure, where both cabin cooling and battery cooling are ON. Cabin cooling may be requested for ambient above 0° C. and battery cooling may be requested at any ambient temperature. With reference to FIG. 3, the third heat exchanger 42 receives the high-pressure, high-temperature vapor discharged from the compressor 18 and condenses it into high-pressure, intermediate-temperature liquid by rejecting heat to the ambient. The blend door 90 in the HVAC case 22 blocks the airflow to the second heat exchanger 24 (i.e., in a 'full cold' position) to allow minimal heat transfer between the internal hot refrigerant and the external cool air. The first expansion valve 38 is in an opening mode to allow free flow (i.e., minimal pressure loss across the device). Therefore, refrigerant status out of the compressor 18 is similar to that out of the second heat exchanger 24, as well as that out of the first expansion valve 38. The third expansion valve 50 operates in the expansion mode to throttle the high-pressure, intermediate-temperature liquid out of the third heat exchanger 42 into low-pressure, low-temperature liquid-vapor mixture and supply to the fourth heat exchanger 30 (i.e., 'cold HEX') for cabin cooling. Similarly, in the parallel path, the second expansion valve 52 also operates in the expansion mode to throttle the high-pressure, intermediate-temperature liquid out of the third heat exchanger 42 into low-pressure, low-temperature liquid-vapor mixture and supply to the first heat exchanger 54 (i.e., 'cold HEX') for battery cooling. The low-pressure, low-temperature, essentially vapor (i.e., pure vapor or predominately vapor with a small portion of liquid) out of the fourth heat exchanger 30 and the first heat exchanger 54 merges, enters the accumulator 36, and finally flows back to the compressor 18 to complete the cycle. The first shut-off valve 40 and the second shut-off valve 46 remain closed to prevent any refrigerant flow in this cooling mode.

Figure 7:
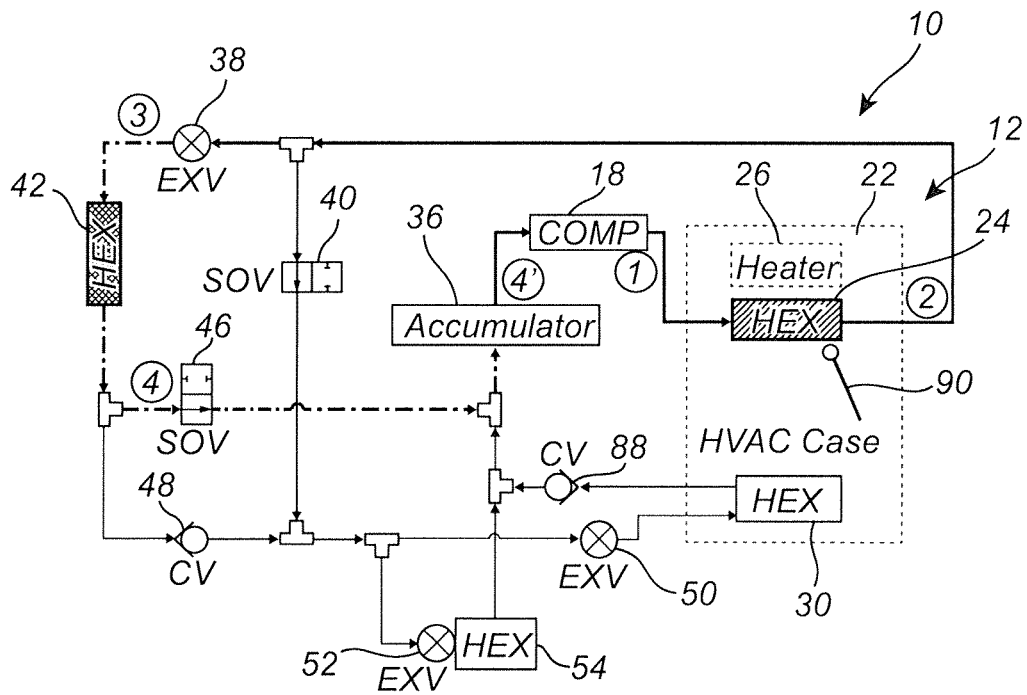
FIG. 7 is a schematic diagram of one illustrative embodiment of a first heating mode utilizing and air source utilized by the thermal management heat pump system of the present disclosure.

FIG. 7 is a schematic diagram of one illustrative embodiment of a first heating mode utilizing an air source utilized by the thermal management heat pump system 10 of the present disclosure. Cabin heating may be requested for ambient below 15° C. In this first heating mode, the second heat exchanger 24 receives the high-pressure, high-temperature refrigerant vapor discharged from the compressor 18 and condenses it into high-pressure, intermediate-temperature liquid by rejecting heat to the cabin airflow (i.e., 'hot HEX'; hence warming the cabin). The blend door 90 in the HVAC case 22 moves to a 'full heat' position to allow all airflow to pass through the second heat exchanger 24. The first expansion valve 38 now operates in the expansion mode to throttle the high-pressure, intermediate-temperature liquid out of the second heat exchanger 24 into low-pressure, low-temperature liquid-vapor mixture and supply to the third heat exchanger 42 (i.e., 'cold HEX') to absorb heat from ambient air. The low-pressure, low-temperature, essentially vapor (i.e., pure vapor or predominately vapor with a small portion of liquid) out of the third heat exchanger 42 enters the accumulator 36 via the second shut-off valve 46, and finally flows back to the compressor 18 to complete the cycle. In this first heating mode, the first shut-off valve 40, the second expansion valve 52, and the third expansion valve 50 operate in closed position to prevent any refrigerant flow.

Figure 8:
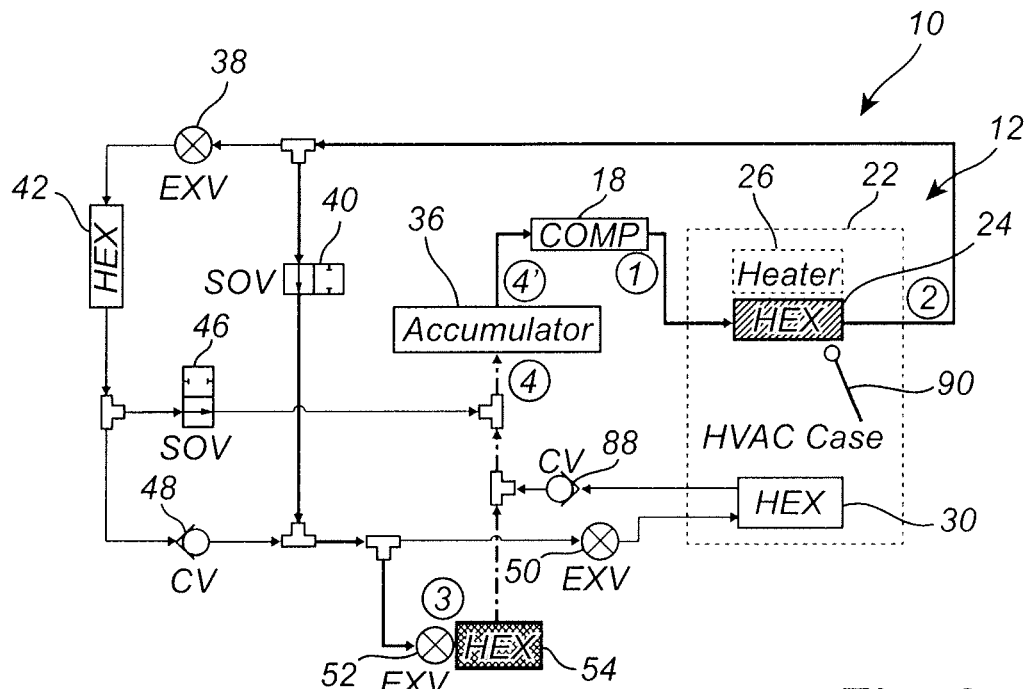
FIG. 8 is a schematic diagram of one illustrative embodiment of a second heating mode utilizing a coolant source utilized by the thermal management heat pump system of the present disclosure.

FIG. 8 is a schematic diagram of one illustrative embodiment of a second heating mode utilizing a coolant source utilized by the thermal management heat pump system 10 of the present disclosure. As the air source may become limited below −10° C., this mode takes advantage of a potential heat source from the coolant side generated by ESS and power electronics via thermal exchange in the first heat exchanger 54. The coolant source could be naturally utilized (with no special operation on the power electronics 66 (FIGS. 1 and 2)), or deliberately utilized by running the power electronics 66 in an inefficient manner to generate waste heat as needed. In this second heating mode, the second heat exchanger 24 receives the high-pressure, high-temperature refrigerant vapor discharged from the compressor 18 and condenses it into high-pressure, intermediate-temperature liquid by rejecting heat to the cabin airflow (i.e., 'hot HEX'; hence warming the cabin). The blend door 90 in the HVAC case 22 moves to a 'full heat' position to allow all airflow to pass through the second heat exchanger 24. The second expansion valve 52 now operates in the expansion mode to throttle the high-pressure, intermediate-temperature liquid out of the second heat exchanger 24 into low-pressure, low-temperature liquid-vapor mixture and supply to the first heat exchanger 54 (i.e., 'cold HEX') to absorb heat from coolant. The low-pressure, low-temperature, essentially vapor (i.e., pure vapor or predominately vapor with a small portion of liquid) out of the first heat exchanger 54 enters the accumulator 36, and finally flows back to the compressor 18 to complete the cycle. In this second heating mode, the second shut-off valve 46, the first expansion valve 38, and the third expansion valve 50 operate in closed position to prevent any refrigerant flow. The second check valve 88 may prevent potential refrigerant backflow into the fourth heat exchanger 30.

Figure 9:
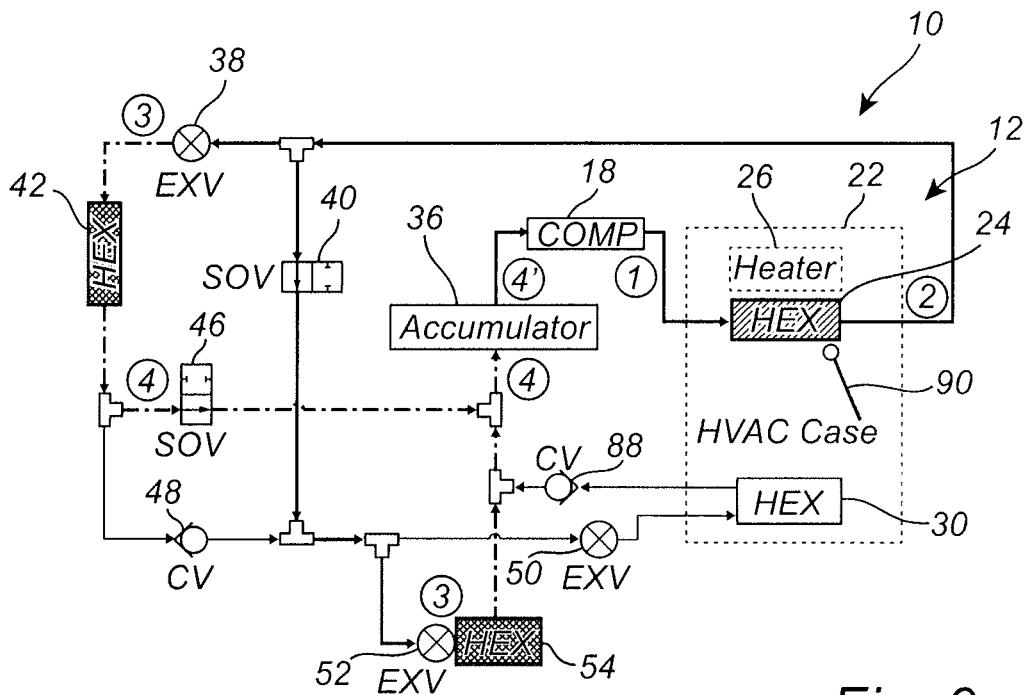
FIG. 9 is a schematic diagram of one illustrative embodiment of a third heating mode utilizing air and coolant sources utilized by the thermal management heat pump system of the present disclosure.

FIG. 9 is a schematic diagram of one illustrative embodiment of a third heating mode utilizing both air and coolant sources utilized by the thermal management heat pump system 10 of the present disclosure. This mode scavenges waste heat from the coolant side generated by ESS and power electronics via thermal exchange in the first heat exchanger 54, i.e., both the ambient air and coolant serving as heat sources. In this third heating mode, the second heat exchanger 24 receives the high-pressure, high-temperature refrigerant vapor discharged from the compressor 18 and condenses it into high-pressure, intermediate-temperature liquid by rejecting heat to the cabin airflow (i.e., 'hot HEX'; hence warming the cabin). The blend door 90 in the HVAC case 22 moves to a 'full heat' position to allow all airflow to pass through the second heat exchanger 24. The first expansion valve 38 operates in the expansion mode to throttle a portion of the high-pressure, intermediate-temperature liquid out of the second heat exchanger 24 into low-pressure, low-temperature liquid-vapor mixture and supply to the third heat exchanger 42 (i.e., 'cold HEX') to absorb heat from ambient air. In parallel, the first shut-off valve 40 now opens to allow the rest of the high-pressure, intermediate-temperature liquid out of the second heat exchanger 24 into the second expansion valve 52 where it is throttled into low-pressure, low-temperature liquid-vapor mixture and supply to the first heat exchanger 54 (i.e., 'cold HEX') to absorb heat from the coolant circuit. The low-pressure, low-temperature, essentially vapor (i.e., pure vapor or predominately vapor with a small portion of liquid) out of the third heat exchanger 42 and the first heat exchanger 54 merges, enters the accumulator 36, and finally flows back to the compressor 18 to complete the cycle. In this third heating mode, the third expansion valve 50 operates in the closing mode to prevent any refrigerant flow into the fourth heat exchanger 30. The second check valve 88 may prevent potential refrigerant backflow into the fourth heat exchanger 30.

Figure 10:
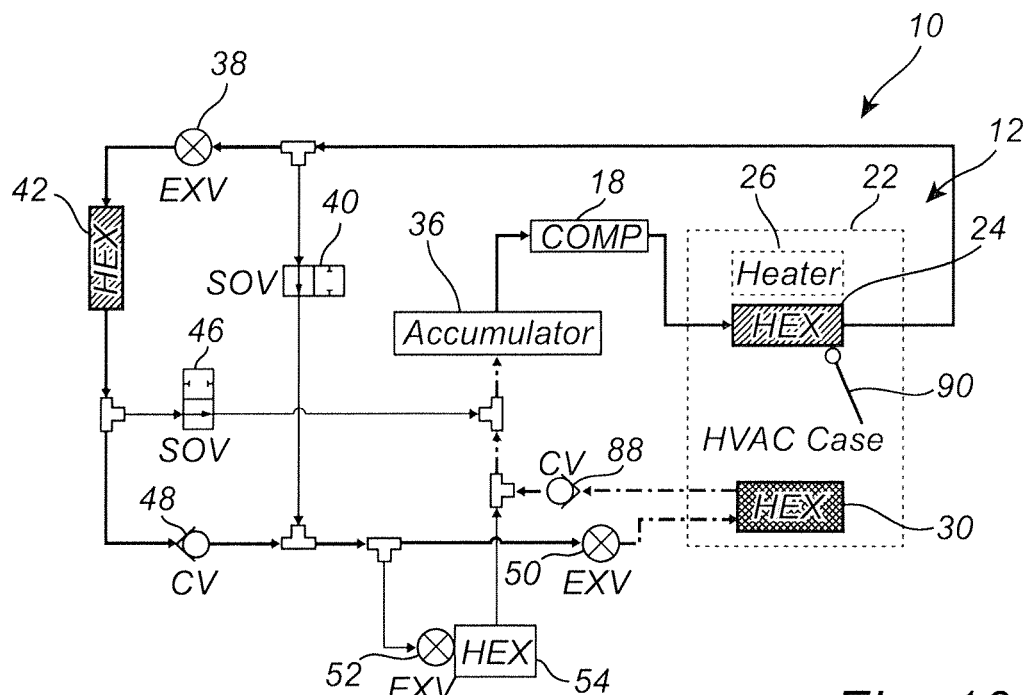
FIG. 10 is a schematic diagram of one illustrative embodiment of a first dehumidification mode utilized by the thermal management heat pump system of the present disclosure.

FIG. 10 is a schematic diagram of one illustrative embodiment of a first dehumidification mode utilized by the thermal management heat pump system 10 of the present disclosure, where the third heat exchanger 42 functions as condenser (i.e., 'hot HEX') to reject heat to ambient air. This mode may occur for relatively warm ambient, e.g. above 15° C. In this first dehumidification mode, the high-pressure, high-temperature refrigerant vapor discharged from the compressor 18 rejects heat in both the second heat exchanger 24 and the third heat exchanger 42 and condenses into high-pressure, intermediate-temperature liquid. The blend door 90 in the HVAC case 22 moves to a 'full heat' position to allow all airflow to pass through the second heat exchanger 24. The first expansion valve 38 may be controlled in the expansion mode or opening mode, dependent upon the reheat load on the second heat exchanger 24. The third expansion valve 50 operates in the expansion mode to throttle high-pressure, intermediate-temperature liquid out of the third heat exchanger 42 into low-pressure, low-temperature liquid-vapor mixture and supply to the fourth heat exchanger 30 (i.e., 'cold HEX') to absorb heat from the cabin airflow, hence lowering the air temperature to below dew point for dehumidification. The low-pressure, low-temperature liquid-vapor mixture boils into low-pressure, low-temperature, essentially vapor (i.e., pure vapor or predominately vapor with a small portion of liquid), then enters the accumulator 36, and finally flows back to the compressor 18 to complete the cycle. In this first dehumidification mode, the first shut-off valve 40, the second shut-off valve 46, and the second expansion valve 52 operate in closed position to prevent any refrigerant flow.

Figure 11:
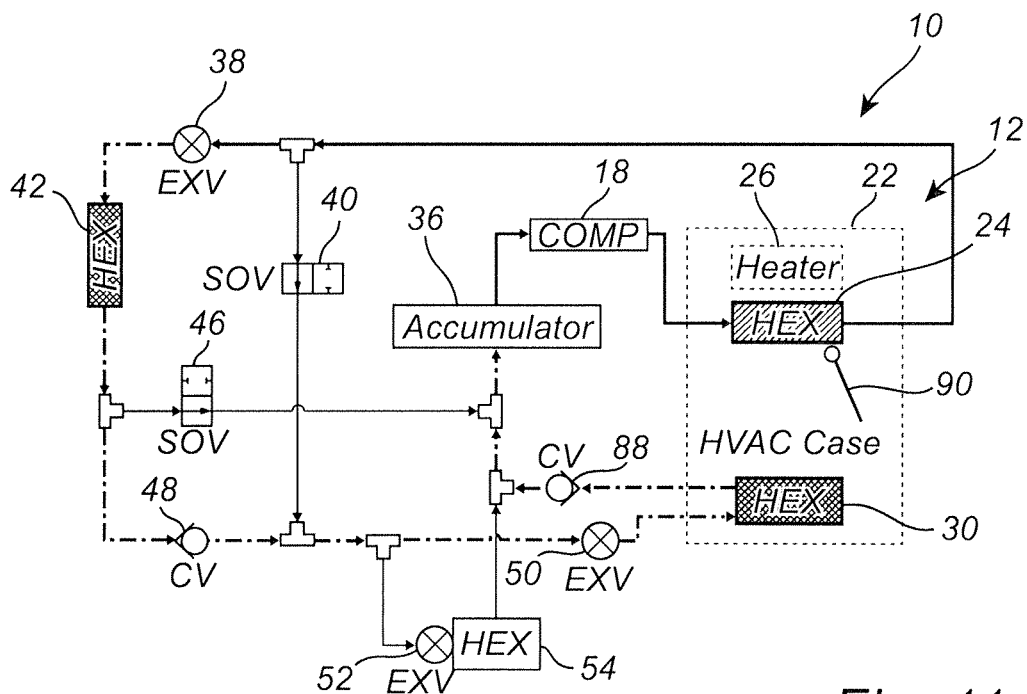
FIG. 11 is a schematic diagram of one illustrative embodiment of a second dehumidification mode utilized by the thermal management heat pump system of the present disclosure.

FIG. 11 is a schematic diagram of one illustrative embodiment of a second dehumidification mode utilized by the thermal management heat pump system 10 of the present disclosure, where the third heat exchanger 42 functions as evaporator (i.e., 'cold HEX') to absorb heat from ambient air. This mode may occur for relatively cool ambient, e.g. below 15° C. In this second dehumidification mode, the high-pressure, high-temperature refrigerant vapor discharged from the compressor 18 rejects heat in the second heat exchanger 24 and condenses into high-pressure, intermediate-temperature liquid. The blend door 90 in the HVAC case 22 moves to a 'full heat' position to allow all airflow to pass through the second heat exchanger 24. The first expansion valve 38 operates in the expansion mode to throttle high-pressure, intermediate-temperature liquid out of the second heat exchanger 24 into low-pressure, low-temperature liquid-vapor mixture and supply to the third heat exchanger 42 (i.e., 'cold HEX') to absorb heat from ambient air. The third expansion valve 50 may be controlled in the expansion mode or opening mode, dependent upon the reheat load on the second heat exchanger 24. The low-pressure, low-temperature liquid-vapor mixture boils in both the third heat exchanger 42 and the fourth heat exchanger 30 (i.e., 'cold HEX') into low-pressure, low-temperature, essentially vapor (i.e., pure vapor or predominately vapor with a small portion of liquid), then enters the accumulator 36, and finally flows back to the compressor 18 to complete the cycle. In this second dehumidification mode, the first shut-off valve 40, the second shut-off valve 46, and the second expansion valve 52 operate in closed position to prevent any refrigerant flow.

Figure 12:
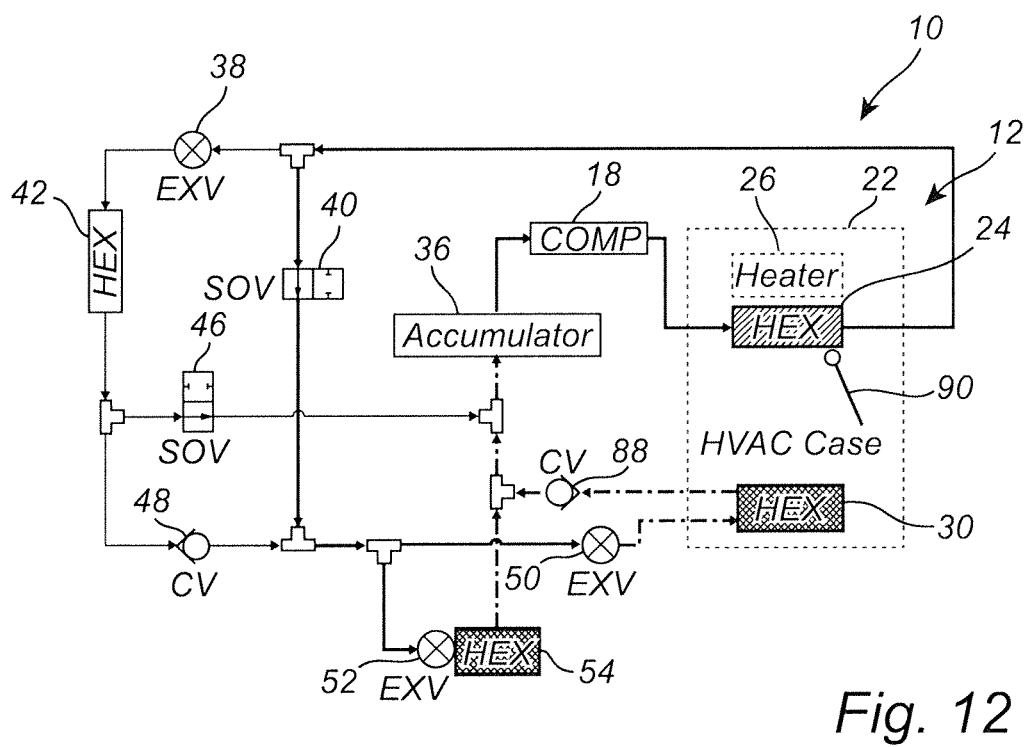
FIG. 12 is a schematic diagram of one illustrative embodiment of a third dehumidification mode utilized by the thermal management heat pump system of the present disclosure.

FIG. 12 is a schematic diagram of one illustrative embodiment of a third dehumidification mode utilized by the thermal management heat pump system 10 of the present disclosure, where the third heat exchanger 42 is bypassed with minimal heat exchange with ambient air. This mode may occur if there is sufficient heat from coolant side to support the reheat load. The front-end cooling fan is OFF and the active grille shutter (AGS) may be closed for aerodynamic efficiency. In this third dehumidification mode, the second heat exchanger 24 receives the high-pressure, high-temperature refrigerant vapor discharged from the compressor 18 and condenses it into high-pressure, intermediate-temperature liquid by rejecting heat to the cabin airflow (i.e., 'hot HEX'). The blend door 90 in the HVAC case 22 moves to a 'full heat' position to allow all airflow to pass through the second heat exchanger 24. The second expansion valve 52 operates in the expansion mode to throttle a portion of the high-pressure, intermediate-temperature liquid out of the second heat exchanger 24 into low-pressure, low-temperature liquid-vapor mixture and supply to the first heat exchanger 54 (i.e., 'cold HEX') to absorb heat from coolant circuit. In parallel, the third expansion valve 50 also operates in the expansion mode to throttle the rest of the high-pressure, intermediate-temperature liquid out of the second heat exchanger 24 into low-pressure, low-temperature liquid-vapor mixture and supply to the fourth heat exchanger 30 (i.e., 'cold HEX') to absorb heat from ambient. The low-pressure, low-temperature, essentially vapor (i.e., pure vapor or predominately vapor with a small portion of liquid) out of the first heat exchanger 54 and the fourth heat exchanger 30 merges, enters the accumulator 36, and finally flows back to the compressor 18 to complete the cycle. In this third heating mode, the first expansion valve 50 operates in the closing mode for refrigerant to bypass the third heat exchanger 42. The first check valve 48 may prevent refrigerant backflow into the third heat exchanger 42. The first shut-off valve 40 is closed to prevent any refrigerant flow.

Figure 13:
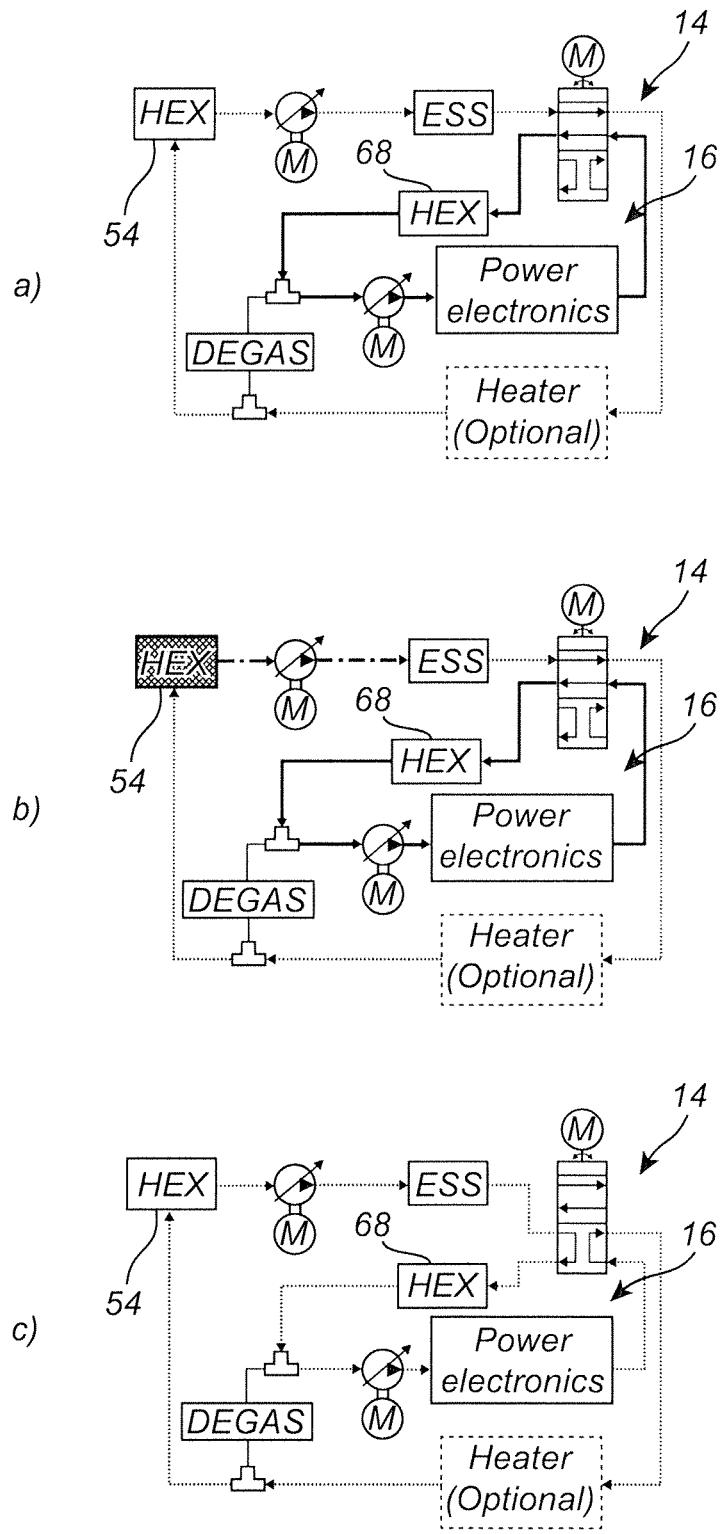
FIG. 13 is schematic diagrams of three illustrative embodiments of a coolant mode utilized by the thermal management heat pump system of the present disclosure.

FIG. 13 is schematic diagrams of three illustrative embodiments of a coolant mode utilized by the thermal management heat pump system 10 (FIG. 1) of the present disclosure, highlighting the selective interconnection of the ESS thermal management loop 14 and the power electronics thermal management loop 16. In isolation mode a) the ESS loop 14 is isolated from the power electronics loop 16 and the first exchanger 54 is OFF (e.g., ESS temperature equalization without active cooling by the refrigerant circuit). In isolation mode b) the ESS loop 14 is isolated from the power electronics loop 16 and the first exchanger 54 is ON (i.e., ESS active cooling by the refrigerant circuit). In interconnection mode c) the ESS loop 14 is interconnected with the power electronics loop 16. This mode may be utilized for ESS and power electronics to be cooled by the fifth heat exchanger 68, or for ESS to be heated by power electronics (e.g. battery heating), or for the thermal management heat pump system 10 to scavenge waste heat from ESS and power electronics.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 14:
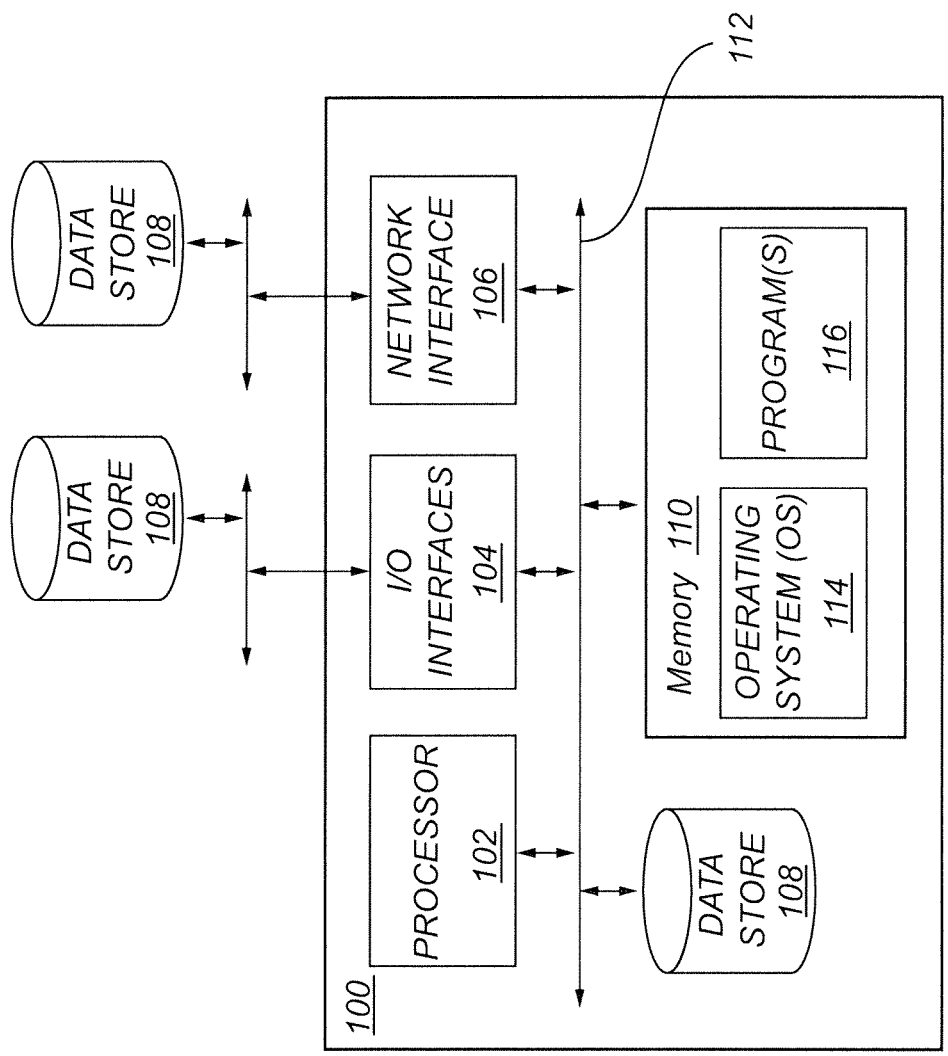
FIG. 14 is a block diagram of a control system that may be used in conjunction with the thermal management heat pump system of the present disclosure.

FIG. 14 illustrates a control system 100 that may be used to direct operation of the thermal management heat pump system of the present disclosure, including a processor 102 associated with the ECU. The processor 102 is a hardware device for executing software instructions embodied in a non-transitory computer-readable medium. The processor 102 may be any custom made or commercially available processor, a central processing unit (CPU), an auxiliary processor among several processors associated with a server, a semiconductor-based microprocessor (in the form of a microchip or chipset), or generally any device for executing software instructions. When the control system 100 is in operation, the processor 102 is configured to execute software stored within the memory 110, to communicate data to and from the memory 110, and to generally control operations of the control system 100 pursuant to the software instructions. I/O interfaces 104 may be used to receive user input from and/or for providing system output to one or more devices or components.

A network interface 106 may be used to enable the control system 100 to communicate on a network, such as the Internet or a Local Area Network (LAN). The network interface 106 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 106 may include address, control, and/or data connections to enable appropriate communications on the network. A data store 108 may be used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media. In one example, the data store 108 may be located internal to the control system 100, such as, for example, an internal hard drive connected to the local interface 112 in the control system 100. Additionally, in another embodiment, the data store 108 may be located external to the control system 100 such as, for example, an external hard drive connected to the I/O interfaces 104 (e.g., a SCSI or USB connection). In a further embodiment, the data store 108 may be connected to the control system 100 through a network, such as, for example, a network-attached file server.

The memory 110 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 110 may incorporate electronic, magnetic, optical, and/or other types of storage media. Note that the memory 110 may have a distributed architecture, where various components are situated remotely from one another but can be accessed by the processor 102. The software in memory 110 may include one or more software programs, each of which includes an ordered listing of executable instructions for implementing logical functions. The software in the memory 110 includes a suitable operating system (O/S) 114 and one or more programs 116. The operating system 114 essentially controls the execution of other computer programs, such as the one or more programs 116, and provides scheduling, input-output control, file and data management, memory management, and communication control and related services. The one or more programs 116 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure is illustrated and described with reference to illustrative embodiments and examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A thermal management heat pump system for a vehicle, the thermal management heat pump system comprising:
   a refrigerant loop comprising a cabin thermal management loop comprising first and third expansion valves that can operate in expansion, opening, and closing modes and a second expansion valve that can operate in at least expansion and closing modes;
   a coolant loop comprising an energy storage system thermal management loop and a power electronics thermal management loop comprising the coolant loop;
   a first heat exchanger selectively coupling the refrigerant loop and the coolant loop responsive to a given operating state of the vehicle;
   a second heat exchanger for receiving refrigerant from a compressor and rejecting heat to an external fluid; and
   a third heat exchanger for receiving the refrigerant, wherein the third heat exchanger serves a function of a hot heat exchanger in a first mode of operation of the thermal management heat pump system, and the third heat exchanger serves a function of a cold heat exchanger in a second mode of operation of the thermal management heat pump system.

2. The thermal management heat pump system of claim 1 further comprises a multi-port valve assembly selectively coupling the energy storage system thermal management loop and the power electronics thermal management loop responsive to the given operating state of the vehicle.

3. The thermal management heat pump system of claim 1, wherein the cabin thermal management loop comprises:
   the compressor for compressing the refrigerant;
   the first expansion valve receiving a first portion of the refrigerant from the second heat exchanger dependent upon the mode of operation; and
   a first shut-off valve receiving a second portion of the refrigerant from the second heat exchanger dependent upon the mode of operation.

4. The thermal management heat pump system of claim 3, wherein the cabin thermal management loop further comprises an accumulator receiving at least one of the refrigerant from the first heat exchanger and the refrigerant from the third heat exchanger via a second shut-off valve dependent upon the mode of operation.

5. The thermal management heat pump system of claim 4, wherein the first heat exchanger receives one or both of a first portion of the refrigerant from the third heat exchanger via a first check valve and the second expansion valve and a first portion of the refrigerant from the first shut-off valve via the second expansion valve dependent upon the mode of operation.

6. The thermal management heat pump system of claim 5, wherein the cabin thermal management loop further comprises a fourth heat exchanger receiving one or both of a second portion of the refrigerant from the third heat exchanger via the first check valve and the third expansion valve and a second portion of the refrigerant from the first shut-off valve via the third expansion valve and directing outlet refrigerant to the accumulator dependent upon the mode of operation.

7. The thermal management heat pump system of claim 6, wherein the cabin thermal management loop further comprises a second check valve preventing refrigerant flow back to the fourth heat exchanger.

8. The thermal management heat pump system of claim 1, wherein the energy storage system thermal management loop comprises an energy storage system and the first heat exchanger.

9. The thermal management heat pump system of claim 6, wherein the power electronics thermal management loop comprises power electronics and a fifth heat exchanger adapted to affect a temperature of the power electronics of the vehicle.

10. The thermal management heat pump system of claim 3, wherein the third heat exchanger receives high-temperature refrigerant from the compressor and functions as condenser to reject heat to an external fluid in a cooling mode of operation.

11. The thermal management heat pump system of claim 3, wherein the second heat exchanger receives high-temperature refrigerant from the compressor and rejects heat to an external fluid and the third heat exchanger receives low-temperature refrigerant from the first expansion valve and functions as an evaporator to absorb heat from the external fluid in a first heating mode of operation.

12. The thermal management heat pump system of claim 5, wherein the second heat exchanger receives high-temperature refrigerant from the compressor and rejects heat to an external fluid and the first heat exchanger receives low-temperature refrigerant from the second expansion valve and functions as an evaporator to absorb heat from the external fluid in a second heating mode of operation.

13. The thermal management heat pump system of claim 5, wherein the second heat exchanger receives high-temperature refrigerant from the compressor and rejects heat to an external fluid, the first heat exchanger receives low-temperature refrigerant from the second expansion valve and functions as an evaporator to absorb heat from the external fluid, and the third heat exchanger receives low-temperature refrigerant from the first expansion valve and functions as an evaporator to absorb heat from the external fluid in a third heating mode of operation.

14. The thermal management heat pump system of claim 6, wherein the second heat exchanger receives high-temperature refrigerant from the compressor and rejects heat to an external fluid, the fourth heat exchanger receives low-temperature refrigerant from the third expansion valve and functions as an evaporator to absorb heat from the external fluid, and the third heat exchanger receives high-temperature refrigerant from the first expansion valve and functions as a condenser to reject heat to the external fluid in a first dehumidification mode of operation.

15. The thermal management heat pump system of claim 6, wherein the second heat exchanger receives high-temperature refrigerant from the compressor and rejects heat to an external fluid, the fourth heat exchanger receives low-temperature refrigerant from the third expansion valve and functions as an evaporator to absorb heat from the external fluid, and the third heat exchanger receives low-temperature refrigerant from the first expansion valve and functions as an evaporator to absorb heat from the external fluid in a second dehumidification mode of operation.

16. The thermal management heat pump system of claim 6, wherein the second heat exchanger receives high-temperature refrigerant from the compressor and rejects heat to an external fluid, the fourth heat exchanger receives low-temperature refrigerant from the third expansion valve and functions as an evaporator to absorb heat from the external fluid, the first heat exchanger receives low-temperature refrigerant from the second expansion valve and functions as an evaporator to absorb heat from the external fluid, and the third heat exchanger is bypassed in a third dehumidification mode of operation.

17. The thermal management heat pump system of claim 2, wherein the multi-port valve assembly is operable for selectively operating the thermal management heat pump system in one of:
   an isolation mode in which the energy storage system thermal management loop is isolated from the power electronics thermal management loop; and
   an interconnection mode in which the energy storage system thermal management loop is interconnected with the power electronics thermal management loop.

18. The thermal management heat pump system of claim 17, wherein the multi-port valve assembly is a four-port valve.

19. A method for operating a thermal management heat pump system for a vehicle, the method comprising:
   given a refrigerant loop comprising a cabin thermal management loop comprising first and third expansion valves that can operate in expansion, opening, and closing modes and a second expansion valve that can operate in at least expansion and closing modes and a coolant loop comprising an energy storage system thermal management loop and a power electronics thermal management loop, selectively coupling the refrigerant loop and the coolant loop responsive to a given operating state of the vehicle using a first heat exchanger, and selectively coupling the energy storage system thermal management loop and the power electronics thermal management loop responsive to the given operating state of the vehicle using a multi-port valve assembly, and compressing a refrigerant to be directed to a second heat exchanger configured to reject heat to an external fluid and to be directed to a third heat exchanger, wherein the third heat exchanger serves a function of a hot heat exchanger in a first mode of operation of a thermal management heat pump system, and the third heat exchanger serves a function of a cold heat exchanger in a second mode of operation of the thermal management heat pump system.

20. A non-transitory computer readable medium stored in a memory and executed by a processor to carry out steps of a method for operating a thermal management heat pump method, the steps comprising:
   given a refrigerant loop comprising a cabin thermal management loop comprising first and third expansion valves that can operate in expansion, opening, and closing modes and a second expansion valve that can operate in at least expansion and closing modes and a coolant loop comprising an energy storage system thermal management loop and a power electronics thermal management loop, selectively coupling the refrigerant loop and the coolant loop responsive to a given operating state of a vehicle using a first heat exchanger, and coupling the energy storage system thermal management loop and the power electronics thermal management loop responsive to the given operating state of the vehicle using a multi-port valve assembly, and compressing a refrigerant to be directed to a second heat exchanger configured to reject heat to an external fluid and to be directed to a third heat exchanger, wherein por the third heat exchanger serves a function of a hot heat exchanger in a first mode of operation of a thermal management heat pump system, and the third heat exchanger serves a function of a cold heat exchanger in a second mode of operation of the thermal management heat pump system.

\* \* \* \* \*

UNITED STATES PATENT AND TRADEMARK OFFICE
CERTIFICATE OF CORRECTION

PATENT NO. : 12,122,213 B2
APPLICATION NO. : 17/892335
DATED : October 22, 2024
INVENTOR(S) : Jing He et al.

Page 1 of 1

It is certified that error appears in the above-identified patent and that said Letters Patent is hereby corrected as shown below:

In the Claims

Column 17; Line 11 (Claim 20): Replace "wherein por the" with --wherein the--.

Signed and Sealed this
Fourth Day of February, 2025

Coke Morgan Stewart
*Acting Director of the United States Patent and Trademark Office*